United States Patent
Ramier et al.

(10) Patent No.: US 9,341,374 B2
(45) Date of Patent: May 17, 2016

(54) FUEL NOZZLE ASSEMBLY WITH REMOVABLE COMPONENTS

(71) Applicant: SIEMENS AKTIENGESELLSCHAFT, München (DE)

(72) Inventors: Stephen A. Ramier, Fredericton (CA); Thomas Hauser, Hönow (DE); Jürgen Buchheim, Berlin (DE)

(73) Assignee: Siemens Energy, Inc., Orlando, FL (US)

( * ) Notice: Subject to any disclaimer, the term of this patent is extended or adjusted under 35 U.S.C. 154(b) by 39 days.

(21) Appl. No.: 14/294,526

(22) Filed: Jun. 3, 2014

(65) Prior Publication Data

US 2015/0345795 A1    Dec. 3, 2015

(51) Int. Cl.
| | |
|---|---|
| F02C 7/20 | (2006.01) |
| F23R 3/28 | (2006.01) |
| F02C 3/22 | (2006.01) |
| F02C 3/24 | (2006.01) |
| F23R 3/14 | (2006.01) |
| F23R 3/36 | (2006.01) |

(52) U.S. Cl.
CPC . *F23R 3/283* (2013.01); *F02C 3/22* (2013.01); *F02C 3/24* (2013.01); *F23R 3/14* (2013.01); *F23R 3/36* (2013.01); *F23R 2900/00019* (2013.01)

(58) Field of Classification Search
CPC ............ F23R 3/60; F23R 3/283; F23R 3/286; F23R 3/36; F23R 3/14; F23D 11/107; F23D 17/002; F02C 7/20
See application file for complete search history.

(56) References Cited

U.S. PATENT DOCUMENTS

| | | | | |
|---|---|---|---|---|
| 1,474,603 | A * | 11/1923 | Morse | F23D 11/107 239/404 |
| 3,283,502 | A * | 11/1966 | Lefebvre | F23R 3/14 60/739 |
| 3,893,296 | A | 7/1975 | Fredriksen | |
| 4,559,009 | A * | 12/1985 | Marino | F23D 11/14 239/402.5 |
| 5,228,283 | A * | 7/1993 | Sciocchetti | F02C 3/30 60/737 |
| 5,761,907 | A | 6/1998 | Pelletier et al. | |
| 6,672,073 | B2 | 1/2004 | Wiebe | |
| 6,705,087 | B1 | 3/2004 | Ohri et al. | |
| 6,755,024 | B1 * | 6/2004 | Mao | F23D 11/107 239/416 |
| 7,062,090 | B2 | 6/2006 | Simmons et al. | |
| 7,581,402 | B2 | 9/2009 | Parker | |
| 2008/0072602 | A1 * | 3/2008 | Wasif | F23D 14/78 60/740 |
| 2010/0170267 | A1 * | 7/2010 | Boettcher | F23R 3/283 60/796 |
| 2011/0056206 | A1 * | 3/2011 | Wiebe | F23R 3/283 60/740 |
| 2012/0144834 | A1 | 6/2012 | El Masalme et al. | |
| 2013/0294864 | A1 * | 11/2013 | Bhat | F23R 3/002 411/366.1 |

FOREIGN PATENT DOCUMENTS

| | | |
|---|---|---|
| EP | 2273197 A2 | 1/2011 |
| EP | 2362141 A1 | 8/2011 |

* cited by examiner

*Primary Examiner* — Gerald L Sung (57) ABSTRACT

A fuel nozzle assembly (10) is presented for a gas turbine engine (12). The fuel nozzle assembly (10) includes a rocket unit (14) and a swirler (16) with an aft end (18) in threaded engagement with a forward end (20) of the rocket unit (14). The fuel nozzle assembly (10) may include an oil tip (36) including a clocking feature with a mechanical constraint to orient the oil tip (36) at a predetermined angular orientation (42) relative to the swirler (16). The fuel nozzle assembly (10) may include one or more gas stage inlets (13, 15), one or more oil stage inlets (17, 19), and a flexible hose (26) to direct the oil to a plurality of rocket units (14).

15 Claims, 6 Drawing Sheets

FUEL NOZZLE ASSEMBLY WITH REMOVABLE COMPONENTS

FIELD OF THE INVENTION

The invention relates togas turbine engines, and more particularly to a fuel nozzle assembly of a combustor of a gas turbine engine.

BACKGROUND OF THE INVENTION

Figure 1:
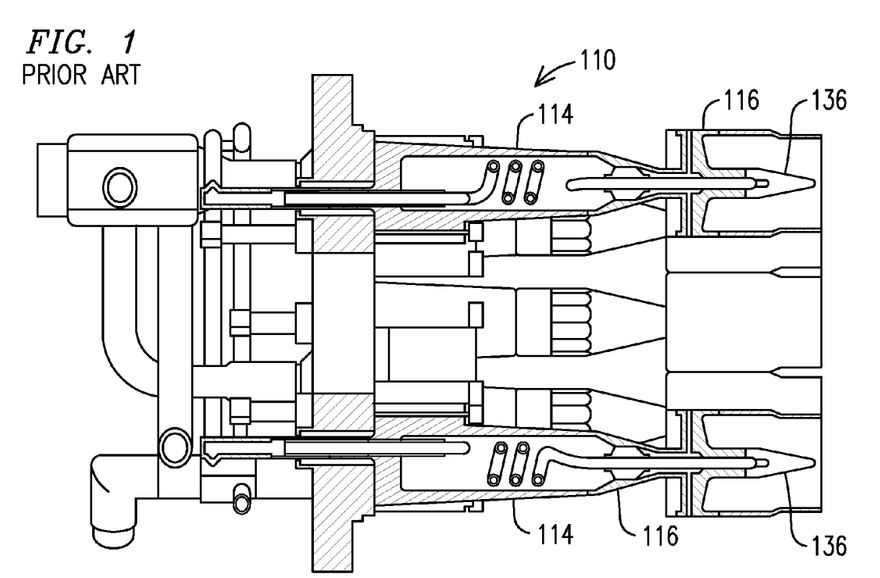
FIG. 1 is a cross-sectional side view of a conventional fuel nozzle assembly used in a gas turbine engine.

FIG. 1 illustrates a conventional fuel nozzle assembly 110 for a gas turbine engine. The fuel nozzle assembly 110 includes various components that are welded or brazed together, such as oil tips 136 that are welded to swirlers 116, where the oil tips 136 have a predetermined angular orientation, for optimal oil atomization and combustion performance. Additionally, the swirlers 116 are welded to rocket units 114, where the swirlers 116 have a predetermined angular orientation, for optimal aerodynamics. However, in the event that repair or replacement of the oil tips 136 or the swirlers 136 is needed, one or more of these welded connections must be dismantled, necessitating a complete disassembly and reassembly of the entire fuel nozzle assembly 110, and involving extensive cost and turnaround time.

BRIEF DESCRIPTION OF THE DRAWINGS

The invention is explained in the following description in view of the drawings that show.

DETAILED DESCRIPTION OF THE INVENTION

Based on the above-discussed limitations of the conventional fuel nozzle assembly 110, the inventors recognized that if the oil tips and the swirlers were more easily removable from the fuel nozzle assembly, the oil tips or the swirlers could be repaired or replaced without the need to disassemble and reassemble the entire fuel nozzle assembly. Thus, the inventors recognized that removable oil tips and removable swirlers would significantly reduce the repair or replacement cost and turnaround time. Based on these recognitions, the inventors developed structural features for each of the oil tips and swirlers, to removably secure the oil tips and the swirlers within the fuel nozzle assembly. Additionally, in order to maintain the oil tips and the swirlers at their respective predetermined angular orientation, the inventors developed a respective clocking feature, to ensure that the oil tips and the swirlers are oriented at their respective predetermined angular orientation, when removably secured within the fuel nozzle assembly.

Figure 2:
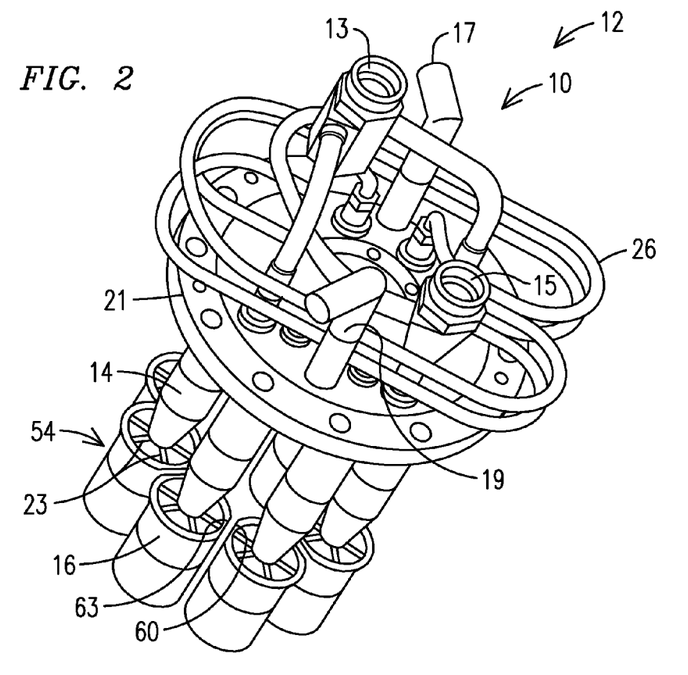
FIG. 2 is a side perspective view of a fuel nozzle assembly of a gas turbine engine.

FIG. 2 illustrates a fuel nozzle assembly 10 for a gas turbine engine 12. The gas turbine engine 12 is capable of operation on a gas or oil feed such that the fuel nozzle assembly 10 includes a pair of gas stage inlets 13, 15, for use when the engine operates in a gas mode and a pair of oil stage inlets 17, 19, for use when the engine operates in an oil mode. However, the embodiments of the present invention are not limited to dual-fuel nozzles, and are applicable to single-fuel gas turbine engines, such as gas or oil turbine engines, for example. Flexible hosing 26 is used to connect the oil stage inlets 17, 19 to a plurality of staged rocket units 14 through a cover plate 21. In an exemplary embodiment, the flexible hosing 26 may be made from stainless steel 316L material, for example. A plurality of swirlers 16 are removably connected to the rocket units 14, in a manner discussed in greater detail below, to receive fuel from the rocket units 14 and to deliver a swirled mixture of air and fuel to a combustion chamber (not shown). In the specific embodiment of FIG. 2, eight staged rocket units 14 and eight staged swirlers 16 are provided in two stages and thus four pieces of flexible hosing 26 connect each oil stage inlet 17, 19 to four rocket units 14 of each stage. However, this specific staged arrangement is exemplary and the embodiments of the present invention are not limited to any specific number of rocket units or stages in a fuel nozzle assembly.

Figure 3A:
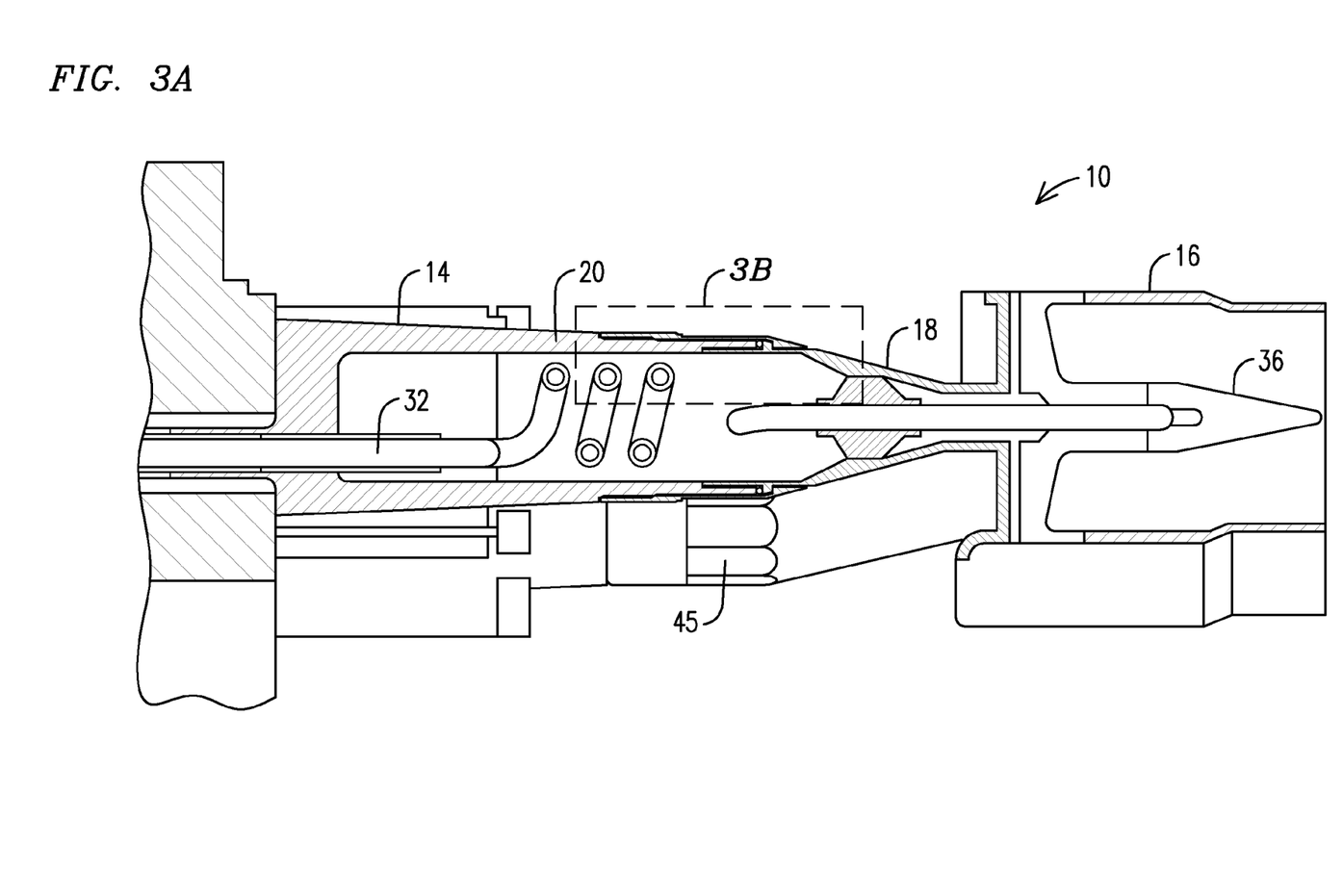
FIGS. 3A-3B are cross-sectional side views of a rocket unit-swirler interface of the fuel nozzle assembly of FIG. 2.
Figure 3B:
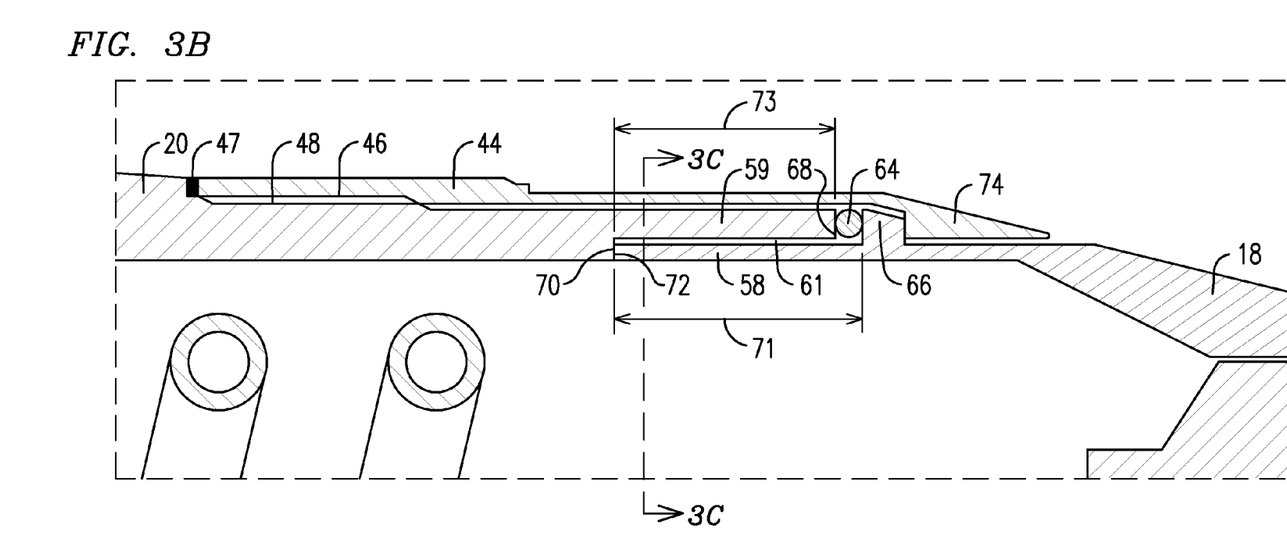
Figure 3C:
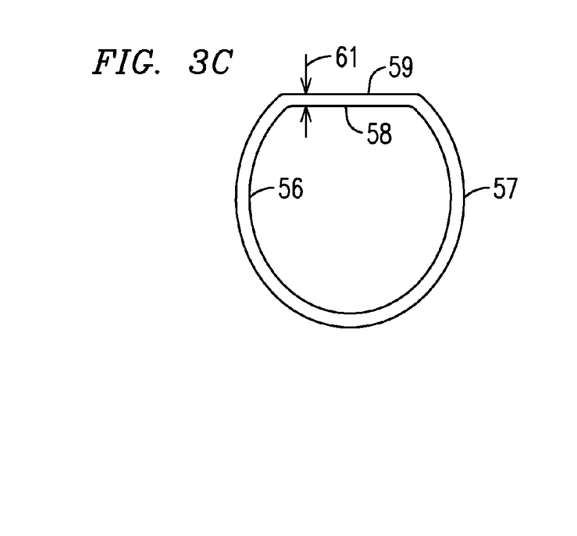
FIG. 3C is a cross-sectional end view of the rocket unit-swirler interface of FIG. 3B along the line 3C-3C.

FIGS. 3A-3C illustrate an interface between a forward end 20 of the rocket unit 14 and an aft end 18 of the swirler 16 of the fuel nozzle assembly 10. As illustrated in FIG. 3B, the interface between the rocket unit 14 and the swirler 16 includes a flat portion 58 of the aft end 18 of the swirler 16 engaged with an inner surface of a flat portion 59 of the forward end 20 of the rocket unit 14. FIG. 3C illustrates a cross-sectional end view of this interface, with the flat portion 58 of a circumference 56 of the swirler 16 radially oriented with the flat portion 59 of a circumference 57 of the rocket unit 14. Thus, the flat portions 58, 59 acts as a clocking feature with a mechanical constraint, to orient the swirler 16 at a predetermined angular orientation 54 (FIG. 2) relative to the rocket unit 14. In an exemplary embodiment, the flat portions 58, 59 orient the swirler 16 within an angular tolerance of the predetermined angular orientation 54, such as within +/−1 degree, for example. As illustrated in FIG. 3C, the diameter of the flat portion 59 of the forward end 20 of the rocket unit 14 exceeds the diameter of the flat portion 58 of the aft end 18 of the swirler 16 by a radial clearance 61. In an exemplary embodiment, the radial clearance 61 is less than a threshold clearance, such that the flat portions 58, 59 act as the mechanical constraint to maintain the radial orientation of the swirler 16 at the predetermined angular orientation 54 (FIG. 2). The flat portion 58 around the circumference 56 of the aft end 18 of the swirler 16 is radially aligned with a flat portion 63 (FIG. 2) around a circumference of an outer surface of the swirler 16. As illustrated in FIG. 2, the predetermined angular orientation 54 of the swirler 16 aligns the flat portion 63 on the outer surface of the swirler 16 with a flat portion 60 on an outer surface of an adjacent swirler 16, such that the plurality of swirlers 16 align and fit within the radial plane of the fuel nozzle assembly 10. Additionally, as illustrated in FIG. 2, the predetermined angular orientation 54 of the swirler 16 orients the vanes 23 of the swirler 16 at predetermined radial positions, for enhanced aerodynamics. Although FIG. 3C depicts that the swirler 16 is aligned in the predetermined angular orientation 54 by aligning the flat portions 58, 59 of the swirler 16 and the rocket unit 14, the embodiments of the present invention may utilize any type of clocking feature with a mechanical constraint, to orient the swirler 16 at the predetermined angular orientation 54.

After aligning the swirler 16 at the predetermined angular orientation 54, the swirler 16 is removably secured to the rocket unit 14. As illustrated in FIGS. 3A-3B, the aft end 18 of the swirler 16 includes an outer radial lip 66 from which the flat portion 58 extends a distance 71 aft to a tip 72. The forward end 20 of the rocket unit 14 includes an inner radial lip 70 from which the flat portion 59 extends a distance 73 forward to a tip 68. As illustrated in FIG. 3B, the distance 71 is greater than the distance 73. A seal 64, such as a C-seal, for example, is positioned between the tip 68 of the forward end 20 of the rocket unit 14 and the outer radial lip 66 of the aft end 18 of the swirler 16. The gas passage between the rocket unit 14 and the swirler 16 is sealed with the C-seal 64. Additionally, vibrations at the interface of the rocket unit 14 and the swirler 16 during operation of the fuel nozzle assembly 10 are absorbed over the distance 73, due to the small radial clearance 61, i.e. the swirler 16 does not vibrate independent of the rocket unit 14. The seal 64 is compressed by a predetermined amount, when the tip 72 of the aft end 18 of the swirler 16 makes contact with the inner radial lip 70 of the forward end 20 of the rocket unit 14. In an exemplary embodiment, during a casting or machining of the swirler 16 and the rocket unit 14, the distances 71, 73 may be subject to a tight control tolerance, such that the seal 64 is compressed by the predetermined amount when the tip 72 makes contact with the inner radial lip 70. In order to move the tip 72 of the aft end 18 of the swirler 16 in an aft direction and into contact with the inner radial lip 70, a nut 44 is provided in threaded engagement with the forward end 20 of the rocket unit 14. As illustrated in FIG. 3B, an inner radial lip 74 of the nut 44 contacts a forward side of the outer radial lip 66, so that upon threaded engagement of the nut 44 with the forward end 20 of the rocket unit 14, the tip 72 of the aft end 18 of the swirler 16 moves into contact with the inner radial lip 70. As further illustrated in FIG. 3B, the nut 44 includes internal threads 46 that are in threaded engagement with external threads 48 on the forward end 20 of the rocket unit 14. Additionally, as illustrated in FIG. 3A, the nut 44 includes flat portions 45 along an outer surface, such that the nut 44 can be tightened by a wrench or a similar tightening tool, for example. The nut 44 engages the forward end 20 of the rocket unit 14, until the tip 72 of the aft end 18 of the swirler 16 makes contact with the inner radial lip 70 of the forward end 20 of the rocket unit 14, indicating that the seal 64 is compressed by the predetermined amount. Additionally, to prevent disengagement of the nut 44 from the rocket unit 14 during operation of the gas turbine engine 12, a tack weld 47 may be applied between an aft tip of the nut 44 and the rocket unit 14, as illustrated in FIG. 3B.

FIGS. 3A-3B illustrate an oil tube 32 and an oil tip 36 that are used to pass oil through the fuel nozzle assembly 10 operating in an oil fuel mode. However, when the fuel nozzle assembly 10 is single-fuel and operates in a single gas mode, the oil tube 32 and the oil tip 36 are not present, since oil is not passed through the fuel nozzle assembly 10. When the fuel nozzle assembly 10 operates in the single gas mode, and the swirler 16 of the fuel nozzle assembly 10 requires repair or replacement, the swirler 16 is removed from the fuel nozzle assembly 10 with the following steps. The tack weld 47 is first removed. The nut 44 is then disengaged from the forward end 20 of the rocket unit 14, by disengaging the internal threads 46 of the nut 44 from the external threads 48 on the forward end 20. The swirler 16 can then be removed from the forward end 20 of the rocket unit 14 and either repaired or replaced with a substitute swirler.

Figure 4:
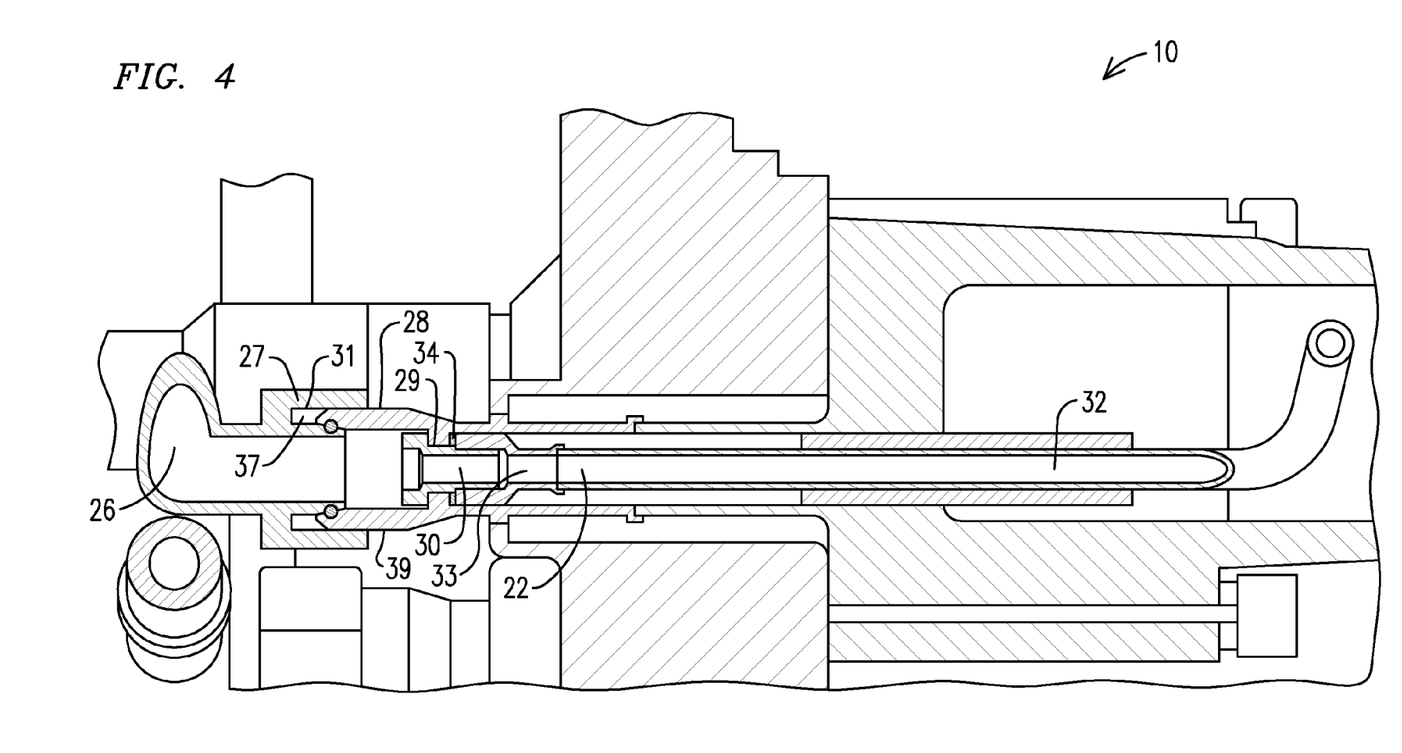
FIG. 4 is a cross-sectional side view of a fuel nozzle-rocket unit interface of a fuel nozzle assembly used in a gas turbine engine.

When the fuel nozzle assembly 10 operates in a single oil mode or in the dual-fuel mode, the oil tube 32 and the oil tip 36 are present within the fuel nozzle assembly 10. Before the swirler 16 can be removed from the dual-fuel or the single oil mode fuel nozzle assembly 10, disengagement of the oil tube 32 from the fuel nozzle assembly 10 is initially performed and will now be discussed. FIG. 4 depicts an aft end 22 of the oil tube 32 that is welded to an oil tube extension 33. A seal 34 is positioned between an aft end of the oil tube extension 33 and a forward surface of an inner radial lip 29 of a compression fitting 28. An extension screw 30 engages an aft surface of the inner radial lip 29 of the compression fitting 28 and engages internal threads within the oil tube extension 33, to move the oil tube extension 33 aft and compress the seal 34 between the aft end of the oil tube extension 33 and the inner radial lip 29 of the compression fitting 28, to form a sealed interface. In an exemplary embodiment, the aft end of the oil tube extension 33 may include a pocket to receive the seal 34. In an exemplary embodiment, the extension screw 30 may have a hexalobular internal drive feature with a hole through the center, to allow oil to pass through, for example. In another exemplary embodiment, the seal 34 may be a flat washer, for example. After the seal 34 is compressed between the oil tube extension 33 and the compression fitting 28, a connection 27 of the flexible hose 26 (FIG. 2) is engaged with the compression fitting 28, to connect the flexible hose 26 via. compression style fitting.

When the fuel nozzle assembly 10 is operating in the single oil mode or the dual-fuel mode, the swirler 16 may need repair or replacement. Initially, the oil tube 32 is disengaged from the fuel nozzle assembly 10 by the following steps. The flexible hose connection 27 is disengaged from the compression fitting 28, by disengaging the internal threads 31 on the flexible hose connection 27 from the external threads 39 on the compression fitting 28. This step provides access to the extension screw 30, which is then disengaged from the oil tube extension 33. The oil tube 32 and the oil tube extension 33 are now disengaged from the fuel nozzle assembly 10 and may be removed along with the swirler 16 that requires repair or replacement. Upon repairing or replacing the swirler 16, the oil tube 32 and oil tube extension 33 may be reconnected to the fuel nozzle assembly 10 by engaging the extension screw 30 within the oil tube extension 33 until the seal 34 is compressed and subsequently engaging the flexible hose connection 27 with the compression fitting 28.

Figure 5:
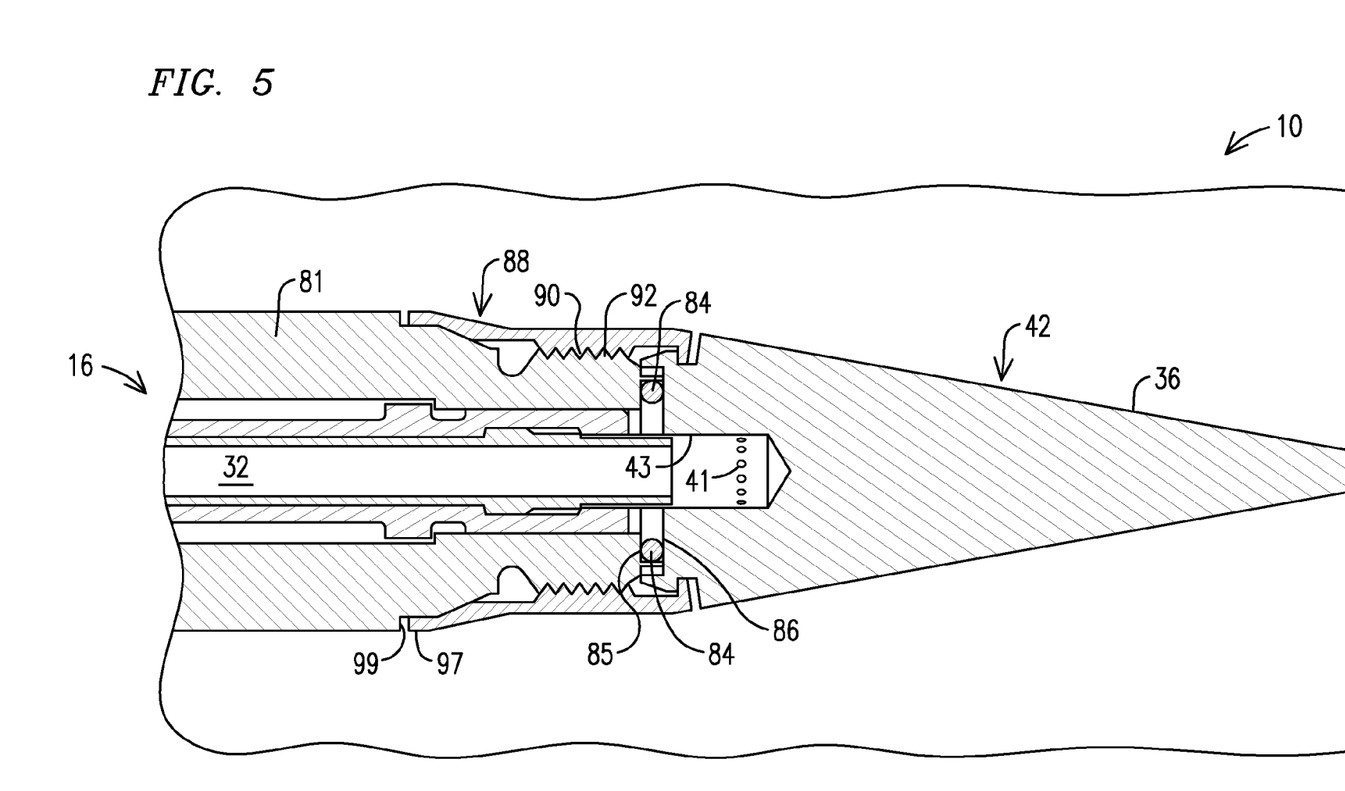
FIG. 5 is a cross-sectional side view of a swirler-oil tip interface of the fuel nozzle assembly of FIGS. 3A-3B.
Figure 6:
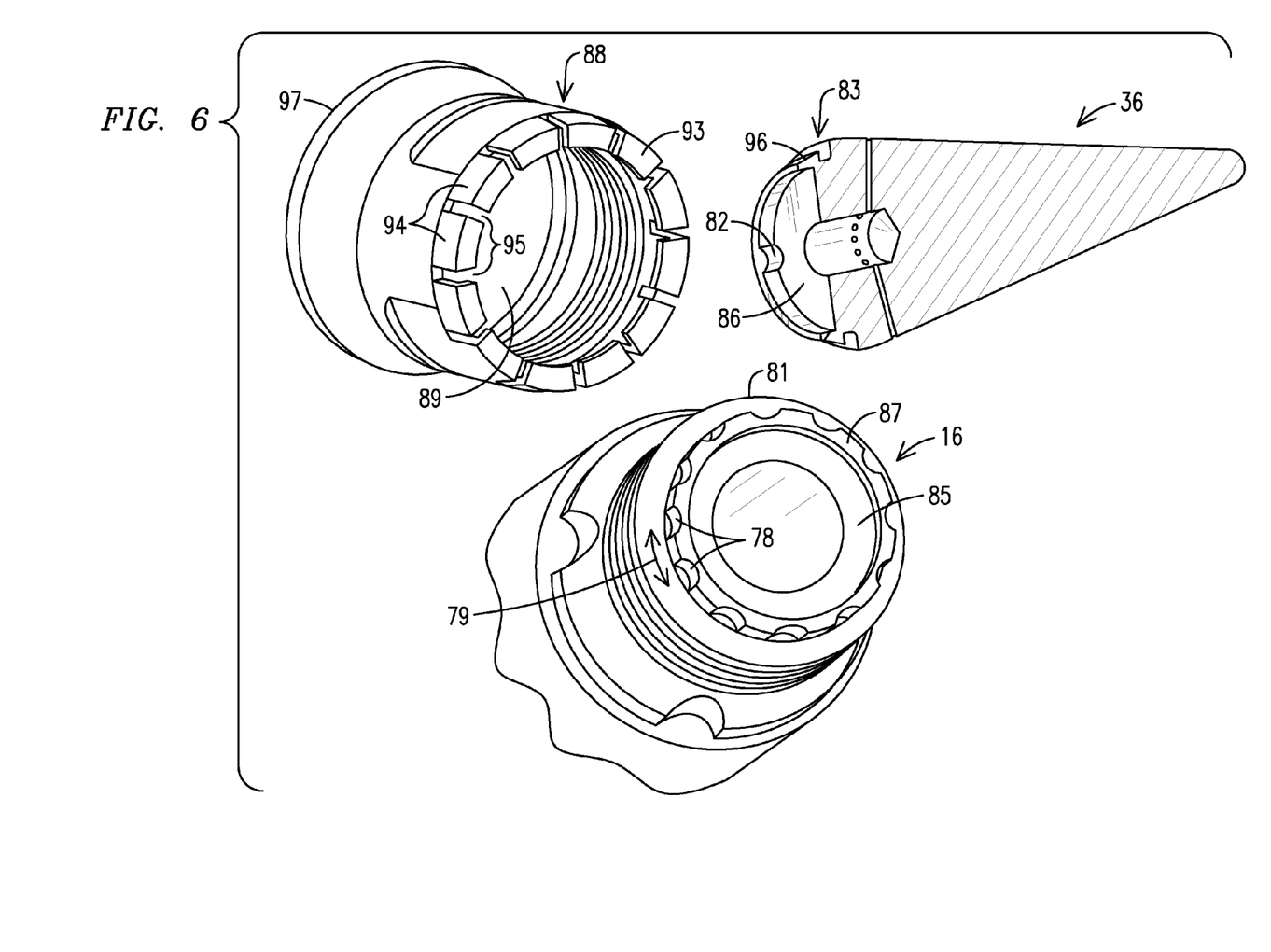
FIG. 6 is an exploded view of the swirler-oil tip interface of FIG. 5.

FIG. 5 illustrates the oil tip 36 removably secured to the swirler 16 in the fuel nozzle assembly 10. In addition to the swirler 16, the oil tip 36 is removable from the fuel nozzle assembly 10, in the event that repair or replacement of the oil tip 36 is required. The oil tip 36 may be removed for repair or replacement, irrespective of whether the swirler 16 requires repair or replacement. The oil tip 36 is removably secured to the swirler 16 using the following steps. As illustrated in FIG. 6, the oil tip 36 is initially passed through a central opening 89 in a nut 88, until a plurality of fingers 94 at a forward end 93 of the nut 88 engage an annular ramp 96 at an aft end 83 of the oil tip 36. The fingers 94 are separated by axial slots 95, such that the fingers 94 are radially adjustable to expand over and engage the annular ramp 96. After the oil tip 36 is secured within the nut 88, the oil tip 36 is radially oriented using a clocking feature with a mechanical constraint to orient the oil tip 36 at a predetermined angular orientation 42 relative to the swirler 16. The oil tip 36 is radially aligned such that a radial projection 82 of the oil tip 36 is received within one of a plurality of lobes 78 spaced by an angular interval 79 on a forward end 81 of the swirler 16, resulting in the predetermined angular orientation 42 of the oil tip 36. In the exemplary embodiment of FIGS. 5-6, twelve lobes 78 are separated by an angular interval 79 of 30 degrees, such that the oil tip 36 can be oriented in 30 degree increments, for example. However, the embodiments of the present invention are not limited to any specific number of lobes or angular interval. In another exemplary embodiment, the lobes 78 are spaced within an angular tolerance of each angular interval 79, such as within +/−1 degree, for example. As illustrated in FIG. 5, the oil tip 36 defines an opening 43 with radial holes 41 to direct the oil for atomization during operation of the fuel nozzle assembly 10. As appreciated by one skilled in the art, the radial holes 41 may be asymmetrically arranged within the opening 43, such that ideal atomization of the oil occurs at a predetermined angular orientation. After the radial projection 82 is received within the appropriate lobe 78 on the forward end 81 of the swirler 16, the oil tip 36 is angularly fixed at the predetermined angular orientation 42. The nut 88 is then engaged with the forward end 81 of the swirler 16, such that internal threads 90 of the nut 88 engage with external threads 92 on the forward end 81 of the swirler 16. As the nut 88 is engaged with the forward end 81 of the swirler 16, a surface 86 (FIG. 6) of the oil tip 36 moves and makes contact with a seal 84 positioned between an annular surface 85 of the forward end 81 and the oil tip 36. As the surface 86 continues to move, the seal 84 is axially compressed along the annular surface 85. The seal 84 is compressed by a predetermined amount when the surface 86 makes contact with a step 87 of the forward end 81 that is positioned outside and forward of the annular surface 85. A height of the step 87 above the annular surface 85 controls the predetermined amount at which the seal 84 is compressed. When the seal 84 is compressed by the predetermined amount, a forward tip of the oil tube 32 (FIG. 5) is aligned with an inlet of the opening 43 of the oil tip 36. The forward tip of the oil tube 32 is sealed to an inner surface of the swirler 16, in a similar manner as appreciated by one skilled in the art. An aft end 97 of the nut 88 may be crimped within a groove 99 along the swirler 16 outer surface to secure the nut 88 and the oil tip 36 to the forward end 81 of the swirler 16. The crimping of the aft end 97 may be performed with a crimping tool that is known to one skilled in the art.

In the event that the oil tip 36 requires re-alignment, repair or replacement, the following steps may be employed. The aft end 97 of the nut 88 is initially de-crimped from the groove 99 along the swirler 16. The nut 88 is then disengaged from the forward end 81 of the swirler 16, which causes the surface 86 of the oil tip 36 to move forward from the annular surface 85 and decompression of the seal 84. The radial projection 82 moves out of the selective lobe 78 during the threaded disengagement of the nut 88. If the oil tip 36 needs to be realigned, then upon threaded disengagement of the nut 88 from the forward end 81, the oil tip 36 may be realigned relative to the swirler 16, by aligning the radial projection 82 with the appropriate lobe 78 and subsequently rethreading the nut 88 along the forward end 81 of the swirler 16. If the oil tip 36 requires repair or replacement, the oil tip 36 may be removed from the nut 88 and repaired or replaced with a substitute oil tip. The repaired or replaced oil tip may then be secured to the nut 88 and the swirler 16 using the above steps.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A fuel nozzle assembly for a gas turbine engine comprising:
a rocket unit;
a swirler with an aft end in threaded engagement with a forward end of the rocket unit; and
a clocking feature with a mechanical constraint to orient the swirler at a predetermined angular orientation relative to the rocket unit;
wherein said clocking feature comprises a flat portion around a circumference of the aft end of the swirler such that upon engagement of the flat portion with the forward end of the rocket unit, the swirler is oriented at the predetermined angular orientation.

2. The fuel nozzle assembly of claim 1, wherein an aft end of an oil tube is threadably engaged to a flexible hose.

3. The fuel nozzle assembly of claim 2, wherein the flexible hose is threadably engaged to a compression fitting; and an extension screw is threadably engaged to the aft end of the oil tube to compress a seal between the aft end of the oil tube and the compression fitting.

4. The fuel nozzle assembly of claim 1, further comprising an oil tip including a clocking feature with a mechanical constraint to orient the oil tip at a predetermined angular orientation relative to the swirler.

5. The fuel nozzle assembly of claim 1, wherein the aft end of the swirler comprises a nut with internal threads in threaded engagement with external threads on the forward end of the rocket unit.

6. The fuel nozzle assembly of claim 1, wherein the flat portion of the aft end is radially aligned with a flat portion around a circumference of an outer surface of the swirler, such that the flat portion on the outer surface of the swirler is aligned with a flat portion on an outer surface of an adjacent swirler of the fuel nozzle assembly.

7. The fuel nozzle assembly of claim 1, further comprising:
a seal positioned between an outer radial lip of the aft end of the swirler and a tip of the forward end of the rocket unit;
wherein the seal is compressed by a predetermined amount based on contact between an inner radial lip of the forward end of the rocket unit and a tip of the aft end of the swirler.

8. The fuel nozzle assembly of claim 7, further comprising a nut with an inner radial lip in contact with a forward side of the outer radial lip, wherein threaded engagement between the nut and the forward end of the rocket unit initiates the contact between the tip of the swirler and the inner radial lip.

9. A fuel nozzle assembly of a gas turbine engine, comprising:
a swirler; and
an oil tip including a clocking feature with a mechanical constraint to orient the oil tip at a predetermined angular orientation relative to the swirler;
wherein said clocking feature includes:
a plurality of lobes separated by an angular interval around a circumference of a forward end of the swirler; and
a radial projection at an aft end of the oil tip, said radial projection selectively received within one of the lobes to orient the oil tip at the predetermined angular orientation.

10. The fuel nozzle assembly of claim 9, further comprising a rocket unit and an aft end of the swirler in threaded engagement with a forward end of the rocket unit.

11. The fuel nozzle assembly of claim 10, further comprising an aft end of an oil tube of the rocket unit threadably engaged to a flexible hose.

12. The fuel nozzle assembly of claim 9, further comprising a seal positioned between an annular surface of the forward end of the swirler and a surface of the aft end of the oil tip, wherein the seal is compressed by a predetermined amount based on contact between the surface and a step of the swirler positioned outside and forward of the annular surface.

13. The fuel nozzle assembly of claim 12, further including a nut with a central opening to secure the oil tip;
   wherein the nut includes internal threads in threaded engagement with external threads on the forward end of the swirler to initiate the contact between the surface and the step.

14. A fuel nozzle assembly of a gas turbine engine, comprising:
   a swirler;
   an oil tip including a clocking feature with a mechanical constraint to orient the oil tip at a predetermined angular orientation relative to the swirler;
   a seal positioned between an annular surface of a forward end of the swirler and a surface of an aft end of the oil tip, wherein the seal is compressed by a predetermined amount based on contact between the surface and a step of the swirler positioned outside and forward of the annular surface; and
   a nut with a central opening to secure the oil tip;
   wherein the nut includes internal threads in threaded engagement with external threads on the forward end of the swirler to initiate the contact between the surface and the step;
   and wherein a forward end of the nut includes a plurality of fingers separated by axial slots such that the fingers are radially adjustable to engage an annular ramp at the aft end of the oil tip.

15. A fuel nozzle assembly for a gas turbine engine comprising:
   at least one gas stage inlet;
   at least one oil stage inlet;
   at least one flexible hose to direct oil from the at least one oil stage inlet;
   a plurality of rocket units to receive oil from the at least one flexible hose;
   a plurality of swirlers with a respective aft end in threaded engagement with a respective forward end of the plurality of rocket units;
   a plurality of oil tips with a respective aft end removably secured to a respective forward end of the plurality of swirlers, said oil tips including a clocking feature with a mechanical constraint to orient the oil tips at a respective predetermined angular orientation; and
   a clocking feature with a mechanical constraint for the plurality of swirlers to orient the swirlers at a respective predetermined angular orientation, said mechanical constraint including a flat portion around a circumference of the respective aft end of the swirlers such that upon engagement of the flat portion with the forward end of the rocket units, the swirlers are oriented at the respective predetermined angular orientation.

* * * * *